United States Patent
Ye et al.

(10) Patent No.: US 8,623,207 B2
(45) Date of Patent: Jan. 7, 2014

(54) LOOSE-PROOF STRUCTURE OF A FILTER CARTRIDGE SHELL

(75) Inventors: Xiuyou Ye, Ningbo (CN); Jianlin Liang, Ningbo (CN); Kaiqin Peng, Ningbo (CN); Daowen Lu, Ningbo (CN)

(73) Assignee: Zhejiang Qinyuan Water Treatment S. T. Co. Ltd., Ningbo, Zhejiang Province (CN)

( * ) Notice: Subject to any disclaimer, the term of this patent is extended or adjusted under 35 U.S.C. 154(b) by 185 days.

(21) Appl. No.: 13/005,547

(22) Filed: Jan. 13, 2011

(65) Prior Publication Data

US 2012/0067804 A1 Mar. 22, 2012

(30) Foreign Application Priority Data

Sep. 21, 2010 (CN) .......................... 2010 1 0290871

(51) Int. Cl.
*B01D 35/30* (2006.01)
(52) U.S. Cl.
USPC ............. 210/232; 210/444; 210/450
(58) Field of Classification Search
USPC .......................................... 210/232, 444, 450
See application file for complete search history.

(56) References Cited

U.S. PATENT DOCUMENTS

| | | | | |
|---|---|---|---|---|
| 1,744,837 A | * | 1/1930 | Pelletier | 210/296 |
| 5,744,030 A | * | 4/1998 | Reid et al. | 210/235 |
| 7,186,338 B2 | * | 3/2007 | Boisvert | 210/232 |

FOREIGN PATENT DOCUMENTS

DE 659997 A1 * 6/1995

* cited by examiner

*Primary Examiner* — Thomas M Lithgow

(57) ABSTRACT

A loose-proof structure of a filter cartridge shell, includes: a filter cartridge shell body, the filter cartridge shell body has an open end which includes several treads in its inside and an upper end surface, and an upper end cover, which is hermetically and spirally coupled with the filter cartridge shell body. The upper cover has a raised rafter edge. The raised rafter edge and the open end are equipped with a loose-proof fixed ring. a periphery surface of the raised rafter edge has loose-proof locking teeth, an inside surface of the loose-proof fixed ring has loose-proof tooth spaces matching with the loose-proof locking teeth. An external end surface of the open end has loose-proof scabs, the loose-proof fixed ring has loose-proof grooves on its bottom matching with the loose-proof scabs.

20 Claims, 3 Drawing Sheets

A-A

A-A

LOOSE-PROOF STRUCTURE OF A FILTER CARTRIDGE SHELL

BACKGROUND OF THE PRESENT INVENTION

1. Field of Invention

The present invention relates to a water purifier, more particularly to a pressure-bearing filter cartridge shell equipment with high sealing, and especially particularly to a loose-proof structure of a filter cartridge shell.

2. Description of Related Arts

A water purifying plant is one kind of water treatment facilities, which is capable of effectively eliminating chlorine, heavy metals, bacteria, virus, algae and suspended solids in the water. A subsequent activated carbon treatment further eliminates organic matters in the water, so that the treated water is clear, clean and sterile which serves people clean and standard drinking water. In existing technology, generally a barrel and an end cover of the water purifying plant are connected hermetically by threads and end surface sealing. The advantages of threads are that the producing process is simple, and the filter cartridge in the filter shell can be replaced conveniently, so as to save the cost. However, this kind of connecting type has its own disadvantages, in long-term operations, the water pressure of the tap-water is unstable, and when a valve opens and closes suddenly and a water pump switches suddenly in under-pressure pipes, the speed of the water changes suddenly, so the pressure increases or decreases steeply and alternately. Therefore, a phenomenon of water hammer appears, the threads of the end cover will loosen easily which leads to leakage or water seepage at a junction of the barrel and the end cover of the filter cartridge shell, the water resource will be wasted. Therefore, people urgently need to solve this technological difficulty.

SUMMARY OF THE PRESENT INVENTION

A technological matter that the present invention solves is to provide a loose-proof structure of a filter cartridge shell regarding to the existing technological difficulty, which is simple in structure, easy to demount and install, reliable in performance and capable of preventing the loosening of the threads of the end cover by the unstable water pressure of the tap-water and the phenomenon of water hammer.

A technical proposal that the present invention adopts is a loose-proof structure of a filter cartridge shell, which comprises:

a filter cartridge shell body, wherein the filter cartridge shell body has an open end, the open end comprises treads in its inside and an upper end surface; and an upper end cover, which is hermetically and spirally coupled with the treads of the filter cartridge shell body, wherein the upper end cover has a raised rafter edge, which is pressed with the upper surface of the open end, the raised rafter edge of the upper end cover and the open end of the filter cartridge shell body are equipped with a loose-proof fixed ring, at least one loose-proof locking tooth is provided on a periphery surface of the raised rafter edge, correspondingly, at least one loose-proof tooth space is provided on an inside surface of the loose-proof fixed ring contacting with the periphery surface of the raised rafter edge and matches with the loose-proof locking teeth, at least one loose-proof scab is provided on an external end surface of the open end, correspondingly, the loose-proof fixed ring has at least one loose-proof groove on a bottom thereof which matches with the loose-proof scab.

In order to optimize the technical proposal, the features further comprise the follows.

The loose-proof fixed ring comprises a locating ring which is extended inwardly on an upper part thereof, and the locating ring is coupled with an upper surface of the raised rafter edge.

A cone-shape ramp with a gradual external diameter is formed on the filter cartridge shell body and the open end, correspondingly, the loose-proof fixed ring has a raised buckle edge on a lower part thereof which is latched and coupled with the cone-shape ramp.

The upper end cover comprises a connecting convex mouth which is spirally connected with the threads in the open end, the connecting convex mouth has a circular sealed groove, and the circular sealed groove is coupled with a soft rubber sealing ring.

Loose-proof locking teeth are provided on the periphery surface of the raised rafter edge, which are arranged by a same radian along the whole circumference, correspondingly, the inside surface of the loose-proof fixed ring contacting with the periphery surface of the raised rafter edge has loose-proof locking tooth spaces which are arranged by the same radian to couple with the loose-proof locking teeth.

Six loose-proof scabs are formed on the external end surface of the open end, which are arranged by the same radian along the circumference, correspondingly, the loose-proof fixed ring has six loose-proof grooves that are arranged by the same radian on a bottom thereof to match with the loose-proof scabs.

Compared to the existing technology, the raised rafter edge of the upper end cover and the open end of the filter cartridge of the present invention are coupled with a loose-proof fixed ring, and at least one loose-proof locking tooth is provided on the periphery surface of the raised rafter edge, correspondingly, at least one loose-proof tooth space is provided on the inside surface of the loose-proof fixed ring contacting with the periphery surface of the raised rafter edge and matches with the loose-proof locking teeth, at least one loose-proof scab is provided on an external end surface of the open end, correspondingly, the loose-proof fixed ring has at least one loose-proof groove on a bottom thereof which matches with the loose-proof scab. The present invention achieves the aim of locking through adding a loose-proof fixed ring on the upper end cover, the loose-proof grooves and the loose-proof tooth spaces are respectively coupled with the loose-proof scabs of the filter cartridge shell body and the loose-proof locking teeth of the upper end cover, so that the upper end cover is not capable of rotating freely, the influences of the unsteady water pressure and the water hammer are prevented efficiently. The present invention is simple in structure, steady in performance and has the advantages of high endurance to water pressure, good sealability, easy to assemble.

DETAILED DESCRIPTION OF THE PREFERRED EMBODIMENT

Figure 1:
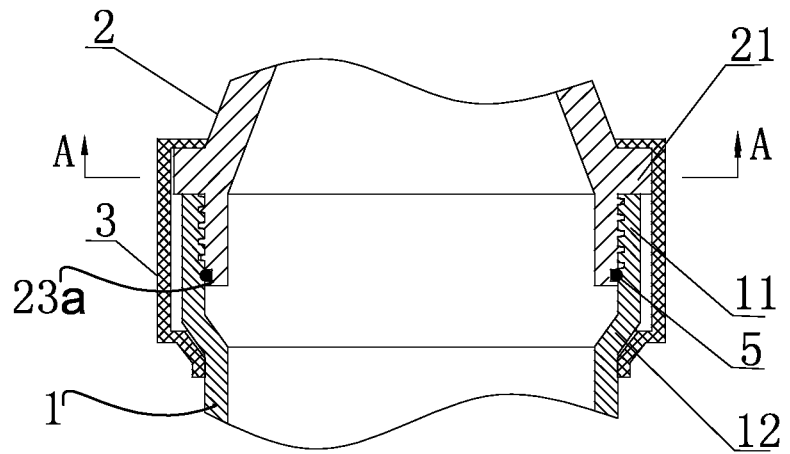
FIG. 1 is a sketch view of a loose-proof structure of a filter cartridge shell according to a preferred embodiment of the present invention.
Figure 2:
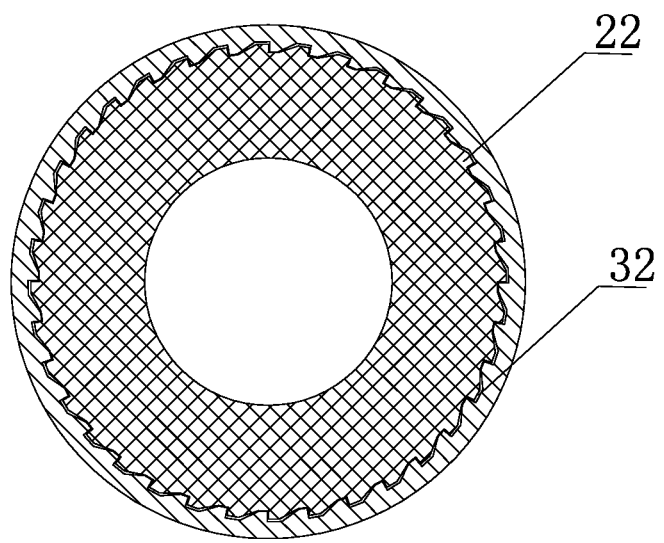
FIG. 2 is an A-A direction sectional view of the FIG. 1.
Figure 3:
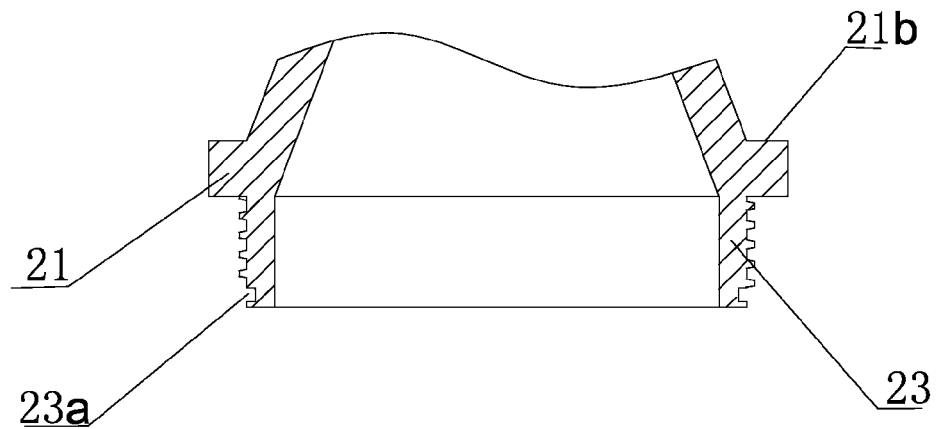
FIG. 3 is a sketch view of the upper end cover of the FIG. 1.
Figure 4:
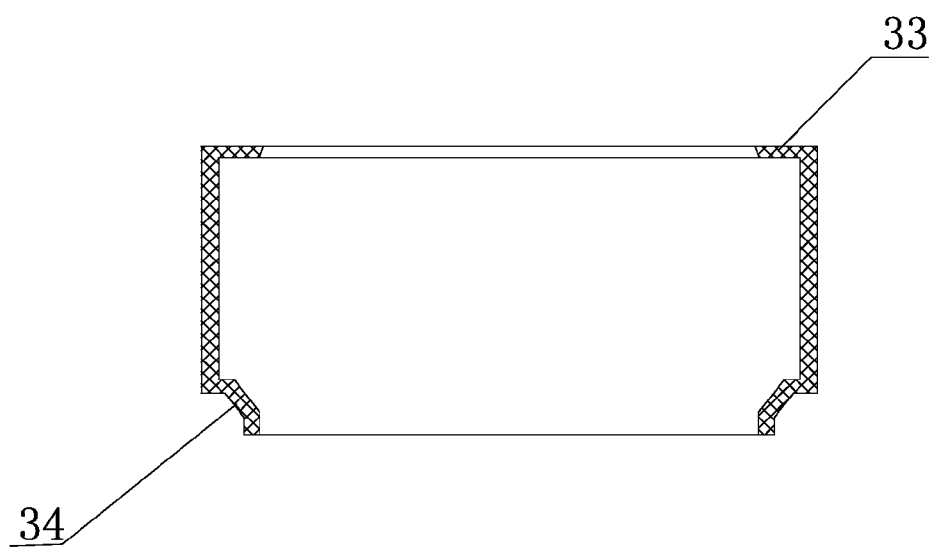
FIG. 4 is a sketch view of the loose-proof fixed ring of the FIG. 1.

Detailed descriptions of the present invention are stated according to the figures.

FIG. 1 to FIG. 7 are the sketch views of the present invention.

The appended drawing reference characters are: filter cartridge shell body 1, open end 11, cone-shape ramp 12, upper end cover 2, raised rafter edge 21, upper surface 21b, loose-proof locking tooth 22, connecting convex mouth 23, sealed groove 23a, loose-proof fixed ring 3, loose-proof groove 31, loose-proof tooth space 32, locating ring 33, raised buckle edge 34, loose-proof scab 4, rubber sealing ring 5.

Referring to FIG. 1 to FIG. 7 of the drawings, the present invention is a loose-proof structure of a filter cartridge shell, comprising: a filter cartridge shell body 1. The filter cartridge shell body 1 has an open end 11. The open end 11 comprises threads in an inside thereof and an upper end surface 21b, and an upper end cover 2, which is hermetically and spirally coupled with the filter cartridge shell body 1, the upper cover 2 has a raised rafter edge 21, which is pressed with the upper surface 21b of the open end 11, the raised rafter edge 21 of the upper end cover 2 and the open end 11 of the filter cartridge shell body 1 are equipped with a loose-proof fixed ring 3, at least one loose-proof locking tooth 22 is provided on a periphery surface of the raised rafter edge 21, correspondingly, at least one loose-proof tooth space 32 is provided on an inside surface of the loose-proof fixed ring 3 contacting with the periphery surface of the raised rafter edge 21 and matches the loose-proof locking tooth 22; at least one loose-proof scab 4 is provided on the external end surface of the open end 11, correspondingly, the loose-proof fixed ring 3 has at least one loose-proof groove 31 on a bottom thereof which matches with the loose-proof scab 4. The upper end cover will not rotate freely through adding the loose-proof fixed ring 3 which is latched and locked with the filter cartridge shell body 1 and the upper end cover 2, so the upper end cover 2 is firmly fixed to the filter cartridge shell body 1, the filter cartridge shell body 1 and the upper end cover 2 will not leak water, the loose-proof fixed ring 3 is also capable of enduring a great water pressure shock, meanwhile, it's easy to assemble and disassemble, the manufacturing processes are simple and the cost is low.

In a first preferred embodiment, referring to the FIG. 1, the open end 11 of the filter cartridge shell body 1 comprises the inside threads, the upper end cover 2 comprises a connecting convex mouth 23 which is connected with the inside threads of the open end 11, the connecting convex mouth 23 has a circinate sealed groove 23a, the circinate sealed groove 23a is coupled with a soft rubber sealing ring 5, the upper end cover 2 and the filter cartridge shell body 1 are installed hermetically and coordinately through the rubber sealing ring 5, the upper end cover 2 comprises a raised rafter edge 21 which is pressed to the upper surface of the open end 11, the raised rafter edge 21 and the open end 11 of the filter cartridge shell body 1 are fitted with a loose-proof fixed ring 3 which is capable of being inserted downwardly to assembled. Referring the FIGS. 2 and 3, the loose-proof fixed ring 3 comprises a locating ring 33 which extends inwardly on an upper portion thereof, and the locating ring 33 and the upper surface 21b of the raised rafter edge 21 are coupled under pressure. loose-proof locking teeth 22 are provided on the periphery surface of the raised rafter edge 21 and are arranged by a same radian along the whole circumference, correspondingly, loose-proof locking tooth spaces 32 are provided on the inside surface of the loose-proof fixed ring 3 and the periphery surface of the raised rafter edge 21 and are arranged in the same radian. The loose-proof locking tooth spaces 32 and the loose-proof locking teeth 22 are latched and coupled. Referring the FIGS. 2 and 7, six loose-proof scabs 4 are provided on the external end surface of the open end 11 of the filter cartridge shell body 1 and are arranged by a same radian along the circumference, correspondingly, the loose-proof fixed ring 3 has six loose-proof grooves 31 that are arranged by the same radian on a bottom thereof which matches the loose-proof scabs 4. The six loose-proof grooves 31 and the loose-proof scabs 4 are set symmetrically and by the same radian, the filter cartridge shell body 1 and the open end 11 forms a cone-shape ramp 12, correspondingly, the loose-proof fixed ring 3 comprises a raised buckle edge 34 which is latched and coupled with the cone-shape ramp 12 on a bottom thereof. The raised buckle edge 34 has an elastic function in installation which is efficient on containing the filter cartridge shell body 1, so that the loose-proof fixed ring 3, the filter cartridge shell body and the upper end cover 2 are contacted closely and seamlessly.

In a second preferred embodiment, loose-proof locking teeth 22 are provided on the periphery surface of the raised rafter edge 21 and are arranged by a same radian along the whole circumference, correspondingly, loose-proof locking tooth spaces 32 are provided on the inside surface of the loose-proof fixed ring 3 contacting with the periphery surface of the raised rafter edge 21 and are arranged in the same radian. Four loose-proof scabs 4 are provided on the external end surface of the open end 11 of the filter cartridge shell body 1 and are arranged in a same radian along the circumference, correspondingly, the loose-proof fixed ring 3 has four loose-proof grooves 31 that are arranged in the same radian on a bottom thereof and matches with the loose-proof scabs 4.

In a third preferred embodiment, loose-proof locking tooth 22 are provided on the periphery surface of the raised rafter edge 21 and are arranged in a same radian along the whole circumference, accordingly, loose-proof locking tooth spaces 32 are provided on the inside surface of the loose-proof fixed ring 3 contacting with the periphery surface of the raised rafter edge 21 and are arranged in the same radian. two loose-proof scabs 4 are provided on the external end surface of the open end 11 of the filter cartridge shell body 1 and are arranged in a same radian along the circumference, correspondingly, the loose-proof fixed ring 3 has two loose-proof grooves 31 that are arranged in the same radian on a bottom thereof and matches with the loose-proof scabs 4.

In a fourth preferred embodiment, loose-proof locking tooth 22 are provided on the periphery surface of the raised rafter edge 21 and are arranged in a same radian along the whole circumference, correspondingly, loose-proof locking tooth spaces 32 are provided on the inside surface of the loose-proof fixed ring 3 contacting with the periphery surface of the raised rafter edge 21 and are arranged in the same radian. Five loose-proof scabs 4 are provided on the external end surface of the open end 11 of the filter cartridge shell body 1 and are arranged in a same radian along the circumference, correspondingly, the loose-proof fixed ring 3 has five loose-proof grooves 31 that are arranged in the same radian on a bottom thereof and matches with the loose-proof scabs 4.

In a fifth preferred embodiment, loose-proof locking tooth 22 are provided on the periphery surface of the raised rafter edge 21 and are arranged in a same radian along the whole circumference, correspondingly, loose-proof locking tooth spaces 32 are provided on the inside surface of the loose-proof fixed ring 3 contacting with the periphery surface of the raised rafter edge 21 and are arranged in the same radian. three loose-proof scabs 4 are provided on the external end surface of the open end 11 of the filter cartridge shell body 1 and are arranged in a same radian along the circumference, correspondingly, the loose-proof fixed ring 3 has three loose-proof grooves 31 that are arranged in the same radian on a bottom thereof and matches with the loose-proof scabs 4.

Figures 5, 6:
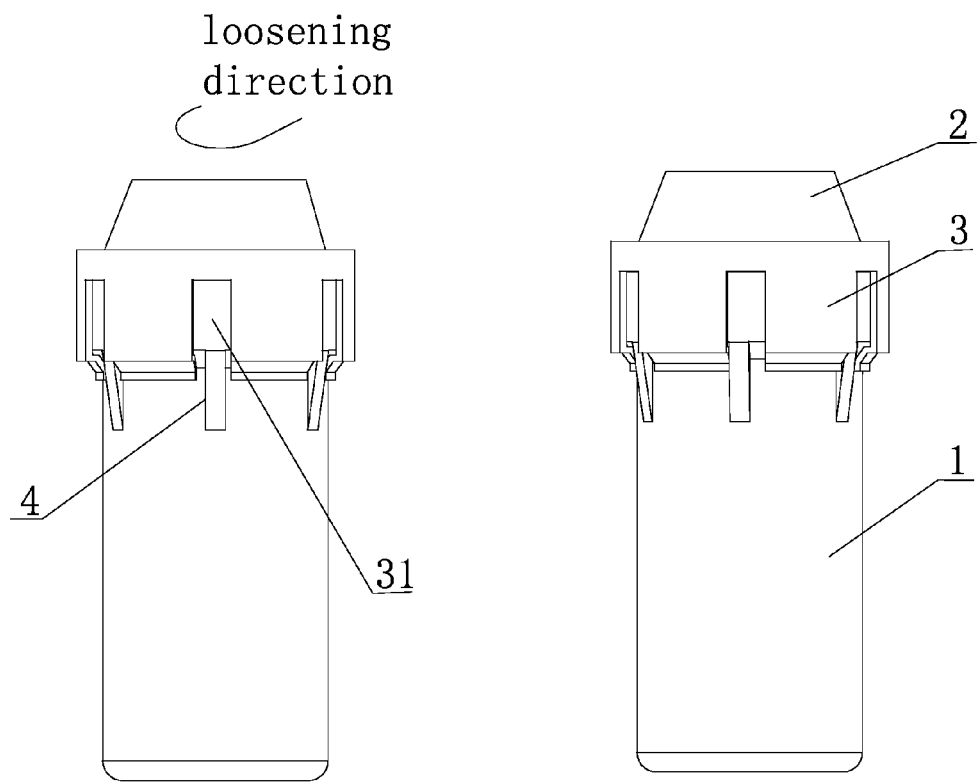
FIG. 5 is a prespective view of a loose-proof structure of a filter cartridge shell according to a preferred embodiment of the present invention, illustrating a first status.
FIG. 6 is a prespective state view of a loose-proof structure of a filter cartridge shell according to a preferred embodiment of the present invention, illustrating a second status.
Figure 7:
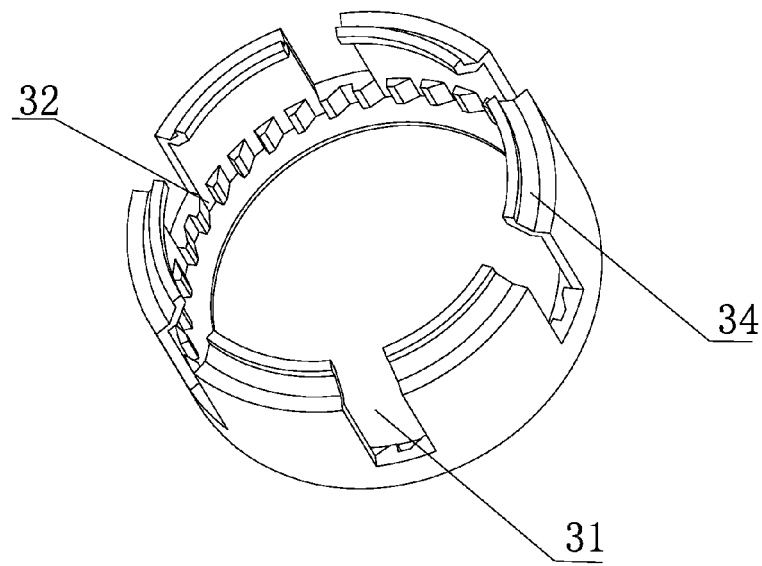
FIG. 7 is a prespective view of the loose-proof fixed ring of the FIG. 1.

The present invention achieves the aim of limiting the loosen of the threads of the upper end edge as follows:

Referring to FIGS. 5 and 6, the upper end cover 2 and the filter cartridge shell body 1 adopts the way of adding the threads and the rubber sealing ring 5 to seal. The loose-proof fixed ring 3 is inserted downwardly after the upper end cover 2 and the filter cartridge shell body 1 are coupled, the loose-proof fixed ring 3 has the loose-proof locking tooth spaces 32 which are coupled with the loose-proof locking teeth 22 of the upper end cover 22, and the loose-proof grooves 31 which are coupled with the loose-proof scabs 4 of the filter cartridge shell body 1 on a bottom thereof, the loose-proof grooves 31 are used to limit an rotatory angle of the upper end cover 2. After the loose-proof fixed ring 3 locked the upper end cover 2, if the upper end cover 2 rotates, the loose-proof fixed ring 3 must be rotated, so the aim of closure is achieved.

When the water pressure is unsteady or the water hammer appears, the upper end cover 2 and the loose-proof fixed ring 3 are rotated towards a direction of loosening the threads. When status 1 turns into status 2, the bottom of the loose-proof fixed ring 3 reaches to the loose-proof scabs 4 of the filter cartridge shell body 1 which prevent a further loosening. Because of the rotating during loosening is small, the upper end cover 2 still makes an effect on sealing, so the leakage disappears. When needing to change a filter cartridge, one just needs to take out the loose-proof fixed ring 3 upwardly and unscrew the upper end cover 2.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A loose-proof structure of a filter cartridge shell, comprising:
   a filter cartridge shell body, which has an open end comprising several threads;
   an upper end cover, which has a raised rafter edge, wherein said raised rafter edge is pressed with an upper surface of said open end;
   a loose-proof fixed ring, wherein said raised rafter edge of said upper end cover and said open end of said filter cartridge shell body are coupled with said loose-proof fixed ring;
   at least one loose-proof locking tooth, provided on a periphery surface of said raised rafter edge, wherein correspondingly, at least one loose-proof tooth space is provided on an inside surface of said loose-proof fixed ring contacting with the periphery surface of said raised rafter edge and matches with said loose-proof locking tooth; and
   at least one loose-proof scab, provided on an external end surface of said open end, wherein correspondingly, said loose-proof fixed ring has at least one loose-proof groove on a bottom of said loose-proof fixed ring, which matches with said loose-proof scab.

2. The loose-proof structure of a filter cartridge shell, as recited in claim 1, wherein said loose-proof fixed ring further comprises a locating ring which extends inwardly on an upper part of said loose-proof fixed ring, said loose-proof fixed ring and an upper surface of said raised rafter edge are coupled under pressure.

3. The loose-proof structure of a filter cartridge shell, as recited in claim 1, wherein a cone-shape ramp with a gradual external diameter is formed between said filter cartridge shell body and said open end, correspondingly, said loose-proof fixed ring has a raised buckle edge on a lower part of said loose-proof fixed ring, which is latched and coupled with said cone-shape ramp.

4. The loose-proof structure of a filter cartridge shell, as recited in claim 2, wherein a cone-shape ramp with a gradual external diameter is formed between said filter cartridge shell body and said open end forms, correspondingly, said loose-proof fixed ring has a raised buckle edge on a lower part of said loose-proof fixed ring, which is latched and coupled with said cone-shape ramp.

5. The loose-proof structure of a filter cartridge shell, as recited in claim 1, wherein said upper end cover further comprises a connecting convex mouth which is spirally connected with the threads of said open end, and a soft rubber sealing ring, wherein said connecting convex mouth has a circular sealed groove to couple with said soft rubber sealing ring.

6. The loose-proof structure of a filter cartridge shell, as recited in claim 2, wherein said upper end cover further comprises a connecting convex mouth which is spirally connected with the threads of said open end, and a soft rubber sealing ring, wherein said connecting convex mouth has a circular sealed groove to couple with said soft rubber sealing ring.

7. The loose-proof structure of a filter cartridge shell, as recited in claim 3, wherein said upper end cover further comprises a connecting convex mouth which is spirally connected with the threads of said open end, and a soft rubber sealing ring, wherein said connecting convex mouth has a circular sealed groove to couple with said soft rubber sealing ring.

8. The loose-proof structure of a filter cartridge shell, as recited in claim 4, wherein said upper end cover further comprises a connecting convex mouth which is spirally connected with the threads of said open end, and a soft rubber sealing ring, wherein said connecting convex mouth has a circular sealed groove to couple with said soft rubber sealing ring.

9. The loose-proof structure of a filter cartridge shell, as recited in claim 1, wherein several loose-proof locking teeth are provided on a periphery surface of said raised rafter edge and are arranged by a same radian along a whole circumference, wherein correspondingly, loose-proof locking tooth spaces are provided on the inside surface of said loose-proof fixed ring contacting with the periphery surface of said raised rafter edge and are arranged in the same radian.

10. The loose-proof structure of a filter cartridge shell, as recited in claim 2, wherein several loose-proof locking teeth are provided on a periphery surface of said raised rafter edge and are arranged by a same radian along a whole circumference, wherein correspondingly, loose-proof locking tooth spaces are provided on the inside surface of said loose-proof fixed ring contacting with the periphery surface of said raised rafter edge and are arranged in the same radian.

11. The loose-proof structure of a filter cartridge shell, as recited in claim 3, wherein several loose-proof locking teeth are provided on a periphery surface of said raised rafter edge and are arranged by a same radian along a whole circumference, wherein correspondingly, loose-proof locking tooth spaces are provided on the inside surface of said loose-proof fixed ring contacting with the periphery surface of said raised rafter edge and are arranged in the same radian.

12. The loose-proof structure of a filter cartridge shell, as recited in claim 4, wherein several loose-proof locking teeth are provided on a periphery surface of said raised rafter edge and are arranged by a same radian along a whole circumference, wherein correspondingly, loose-proof locking tooth spaces are provided on the inside surface of said loose-proof fixed ring contacting with the periphery surface of said raised rafter edge and are arranged in the same radian.

13. The loose-proof structure of a filter cartridge shell, as recited in claim 5, wherein several loose-proof locking teeth are provided on a periphery surface of said raised rafter edge and are arranged by a same radian along a whole circumference, wherein correspondingly, loose-proof locking tooth spaces are provided on the inside surface of said loose-proof fixed ring contacting with the periphery surface of said raised rafter edge and are arranged in the same radian.

14. The loose-proof structure of a filter cartridge shell, as recited in claim 1, wherein six loose-proof scabs are provided on the external end surface of said open end and are arranged by a same radian along the circumference, wherein correspondingly, said loose-proof fixed ring has six loose-proof grooves that are arranged by the same radian on a bottom of said loose-proof fixed ring and matches with the loose-proof scabs.

15. The loose-proof structure of a filter cartridge shell, as recited in claim 2, wherein six loose-proof scabs are provided on the external end surface of said open end and are arranged by a same radian along the circumference, wherein correspondingly, said loose-proof fixed ring has six loose-proof grooves that are arranged by the same radian on a bottom of said loose-proof fixed ring and matches with the loose-proof scabs.

16. The loose-proof structure of a filter cartridge shell, as recited in claim 3, wherein six loose-proof scabs are provided on the external end surface of said open end and are arranged by a same radian along the circumference, wherein correspondingly, said loose-proof fixed ring has six loose-proof grooves that are arranged by the same radian on a bottom of said loose-proof fixed ring and matches with the loose-proof scabs.

17. The loose-proof structure of a filter cartridge shell, as recited in claim 4, wherein six loose-proof scabs are provided on the external end surface of said open end and are arranged by a same radian along the circumference, wherein correspondingly, said loose-proof fixed ring has six loose-proof grooves that are arranged by the same radian on a bottom of said loose-proof fixed ring and matches with the loose-proof scabs.

18. The loose-proof structure of a filter cartridge shell, as recited in claim 5, wherein six loose-proof scabs are provided on the external end surface of said open end and are arranged by a same radian along the circumference, wherein correspondingly, said loose-proof fixed ring has six loose-proof grooves that are arranged by the same radian on a bottom of said loose-proof fixed ring and matches with the loose-proof scabs.

19. The loose-proof structure of a filter cartridge shell, as recited in claim 9, wherein six loose-proof scabs are provided on the external end surface of said open end and are arranged by a same radian along the circumference, wherein correspondingly, said loose-proof fixed ring has six loose-proof grooves that are arranged by the same radian on a bottom of said loose-proof fixed ring and matches with the loose-proof scabs.

20. The loose-proof structure of a filter cartridge shell, as recited in claim 13, wherein six loose-proof scabs are provided on the external end surface of said open end and are arranged by a same radian along the circumference, wherein correspondingly, said loose-proof fixed ring has six loose-proof grooves that are arranged by the same radian on a bottom of said loose-proof fixed ring and matches with the loose-proof scabs.

\* \* \* \* \*